US010021684B2

(12) United States Patent
Prasad et al.

(10) Patent No.: US 10,021,684 B2
(45) Date of Patent: Jul. 10, 2018

(54) MU-MIMO IN MMWAVE SYSTEMS

(71) Applicant: NEC Laboratories America, Inc., Princeton, NJ (US)

(72) Inventors: Narayan Prasad, Willow Grove, PA (US); Yasaman Ghasempour, Lawrenceville, NJ (US); Mohammad Khojastepour, Lawrenceville, NJ (US); Sampath Rangarajan, Bridgewater, NJ (US)

(73) Assignee: NEC Corporation (JP)

(*) Notice: Subject to any disclaimer, the term of this patent is extended or adjusted under 35 U.S.C. 154(b) by 0 days.

(21) Appl. No.: 15/676,517

(22) Filed: Aug. 14, 2017

(65) Prior Publication Data
US 2018/0084532 A1    Mar. 22, 2018

Related U.S. Application Data

(60) Provisional application No. 62/395,567, filed on Sep. 16, 2016.

(51) Int. Cl.
*H04B 7/04* (2017.01)
*H04W 72/04* (2009.01)
*H04B 7/0452* (2017.01)

(52) U.S. Cl.
CPC ........ *H04W 72/042* (2013.01); *H04B 7/0452* (2013.01)

(58) Field of Classification Search
CPC .. H04B 7/0453; H04B 7/0456; H04B 7/0617; H04B 7/0619
USPC ................................................ 375/267, 299
See application file for complete search history.

(56) References Cited

U.S. PATENT DOCUMENTS

2013/0058239 A1* 3/2013 Wang ................... H04B 7/0417
                                                                      370/252
2016/0359533 A1* 12/2016 Obara .................. H04B 7/0408

OTHER PUBLICATIONS

Ye at al., "User Association for Load Balancing in Heterogeneous Cellular Networks", IEEE Transactions on Wireless mmunications, Jun. 2013, pp. 2706-2716, vol. 12, No. 6.

* cited by examiner

*Primary Examiner* — Kevin Kim
(74) *Attorney, Agent, or Firm* — Joseph Kolodka

(57) ABSTRACT

A computer-implemented method is provided for downlink scheduling in a MU-MIMO telecommunication system. The method includes identifying for each of multiple virtual users which collectively form a ground set of virtual users, a respective transmit precoder and receive beamformer combination that maximizes a difference between two submodular set functions applied over the ground set of virtual users, from among a plurality of combinations formed from a respective one of a plurality of transmit precoders and a respective one of a plurality of receive beamformers. The method includes transmitting data from at least some multiple virtual users, based on a downlink transmission schedule determined from the respective transmit precoder and receive beamformer combination identified for the at least some multiple virtual users. The ground set is formed from respective combinations of multiple actual users and the plurality of receive beamformers. The functions correspond to an achievable virtual user transmission rate.

20 Claims, 6 Drawing Sheets

MU-MIMO IN MMWAVE SYSTEMS

RELATED APPLICATION INFORMATION

This application claims priority to U.S. Provisional Pat. App. Ser. No. 62/395,567, filed on Sep. 16, 2016, incorporated herein by reference herein its entirety.

BACKGROUND

Technical Field

The present invention relates to telecommunication systems and more particularly to Multi-User Multiple-Input-Multiple-Output (MU-MIMO) in mmWave systems.

Description of the Related Art

In telecommunication, there exists the classical problem of downlink (DL) Multi-User Multiple-Input-Multiple-Output (MU-MIMO) scheduling with linear transmit precoding. Recently MU-MIMO with linear transmit precoding is being increasingly pursued as a key technology by the industry with a strong emphasis on efficient scheduling algorithms.

However, the intractable combinatorial nature of the problem has so far restricted algorithm design to the realm of simple greedy heuristics. Such algorithms do not exploit any underlying structure in the problem.

There is a need for an improved approach to the problem of MU-MIMO.

SUMMARY

According to an aspect of the present invention, a computer-implemented method is provided for downlink scheduling in a Multi-User Multiple Input Multiple Output (MU-MIMO) telecommunication system. The method includes identifying, by a base station, for each of multiple virtual users which collectively form a ground set of virtual users, a respective transmit precoder and receive beamformer combination that maximizes a difference between two submodular set functions applied over the ground set of virtual users, from among a plurality of combinations formed from a respective one of a plurality of transmit precoders and a respective one of a plurality of receive beamformers. The method further includes transmitting, by the base station, data from at least some of the multiple virtual users, based on a downlink transmission schedule determined from the respective transmit precoder and receive beamformer combination identified for the at least some of the multiple virtual users. The ground set of virtual users is formed from respective combinations of multiple actual users and the plurality of receive beamformers. The two submodular set functions correspond to an achievable virtual user transmission rate.

According to another aspect of the present invention, a base station is provided for downlink scheduling in a Multi-User Multiple Input Multiple Output (MU-MIMO) telecommunication system. The base station includes a processor configured to identify, for each of multiple virtual users which collectively form a ground set of virtual users, a respective transmit precoder and receive beamformer combination that maximizes a difference between two submodular set functions applied over the ground set of virtual users, from among a plurality of combinations formed from a respective one of a plurality of transmit precoders and a respective one of a plurality of receive beamformers. The base station further includes a transmitter configured to transmit data from at least some of the multiple virtual users, based on a downlink transmission schedule determined from the respective transmit precoder and receive beamformer combination identified for the at least some of the multiple virtual users. The ground set of virtual users is formed from respective combinations of multiple actual users and the plurality of receive beamformers. The two submodular set functions correspond to an achievable virtual user transmission rate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to Multi-User Multiple-Input-Multiple-Output (MU-MIMO) in mmWave systems.

Herein, practical choices of linear precoding and power allocation are considered, and it is shown that the resulting problem can be expressed as one where a difference of two submodular set functions has to be maximized. This opens up a new framework for MU-MIMO scheduler design. This framework is used to design an algorithm and demonstrate that gains can be achieved over the classical greedy heuristic with a reasonable complexity. The framework can also incorporate analog receive beamforming which is deemed to be essential in mmWave MIMO systems.

Figure 1:
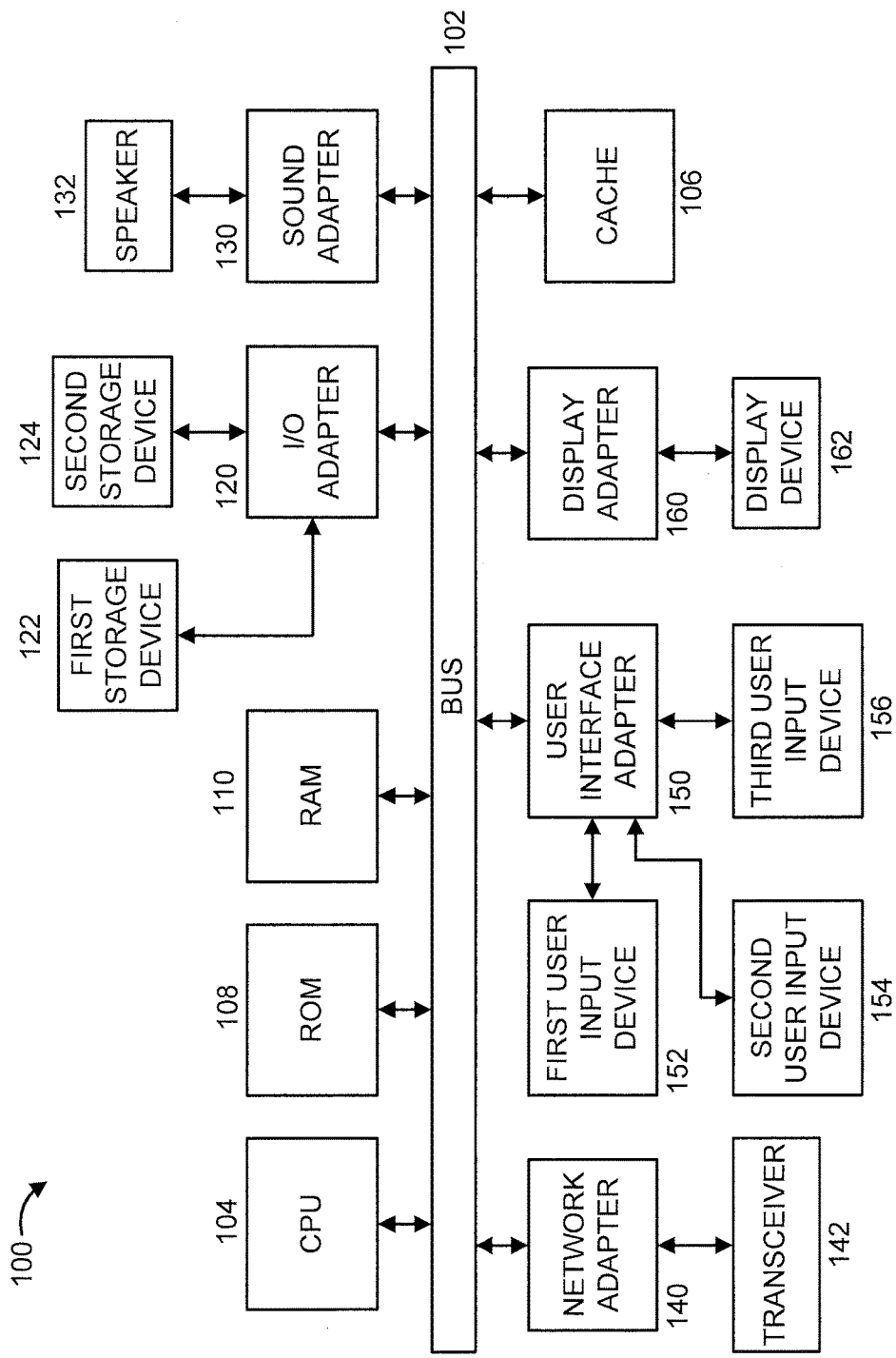
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
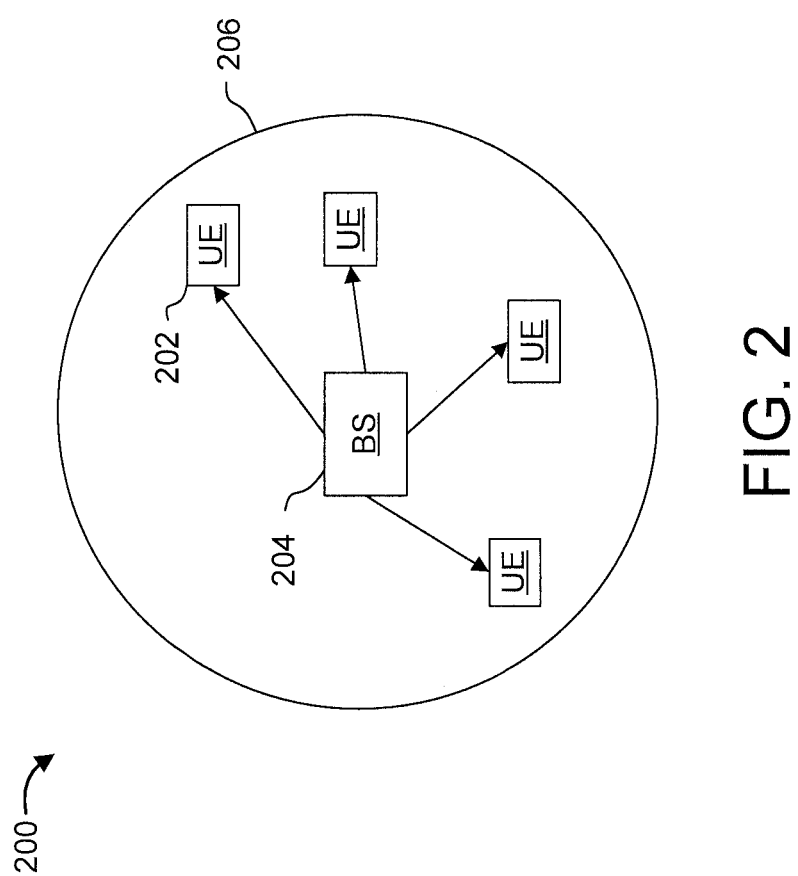
FIG. 2 shows an exemplary MU-MIMO telecommunication system in accordance with an exemplary embodiment of the present invention.

Moreover, it is to be appreciated that system 200 described below with respect to FIG. 2 is a system for implementing respective embodiments of the present principles. Part or all of processing system 100 may be implemented in one or more of the elements of system 200.

Figure 4:
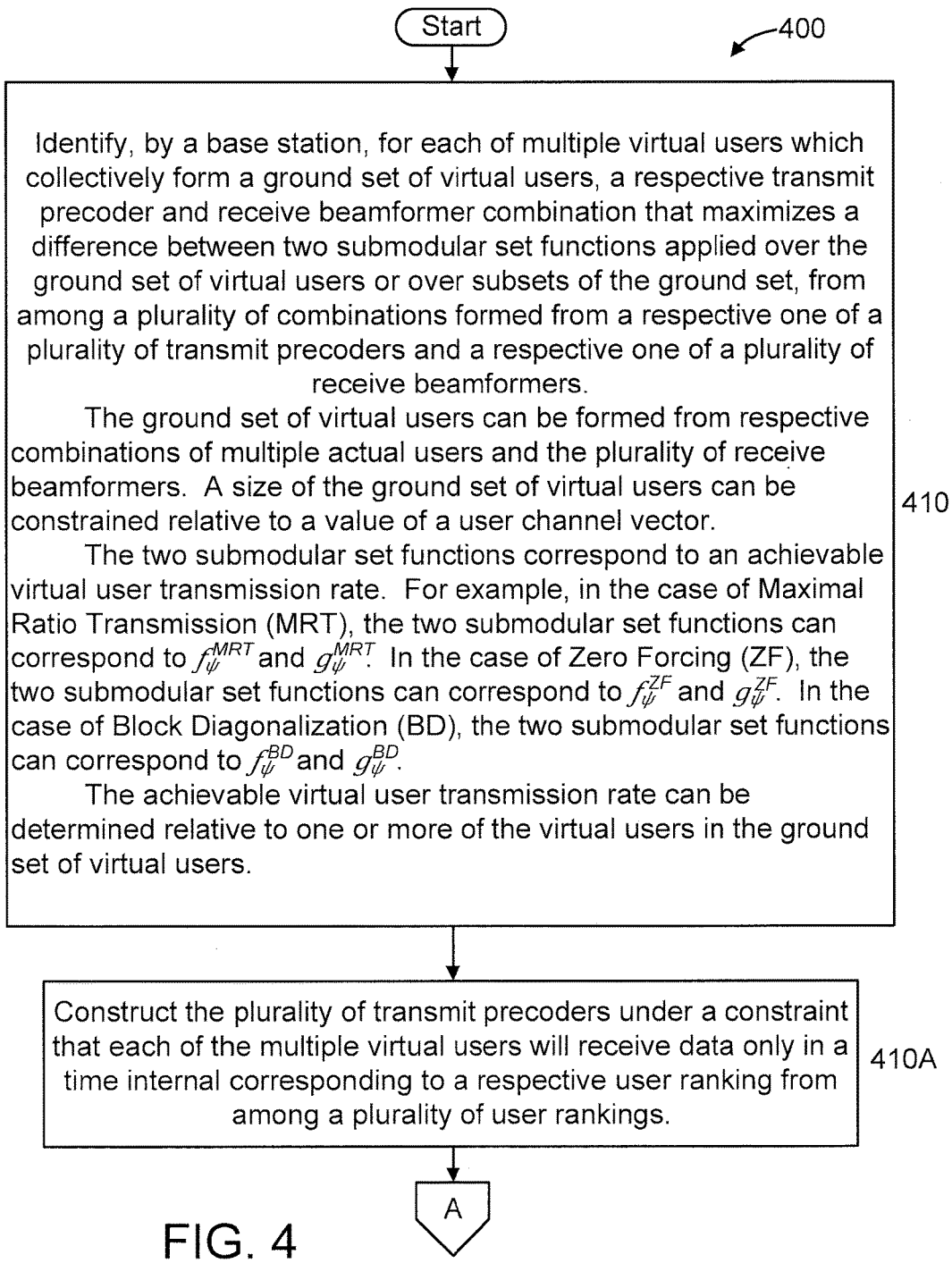
FIGS. 4-6 show an exemplary method for downlink scheduling in a Multi-User Multiple Input Multiple Output (MU-MIMO) telecommunication system, in accordance with an embodiment of the present principles.
Figure 5:
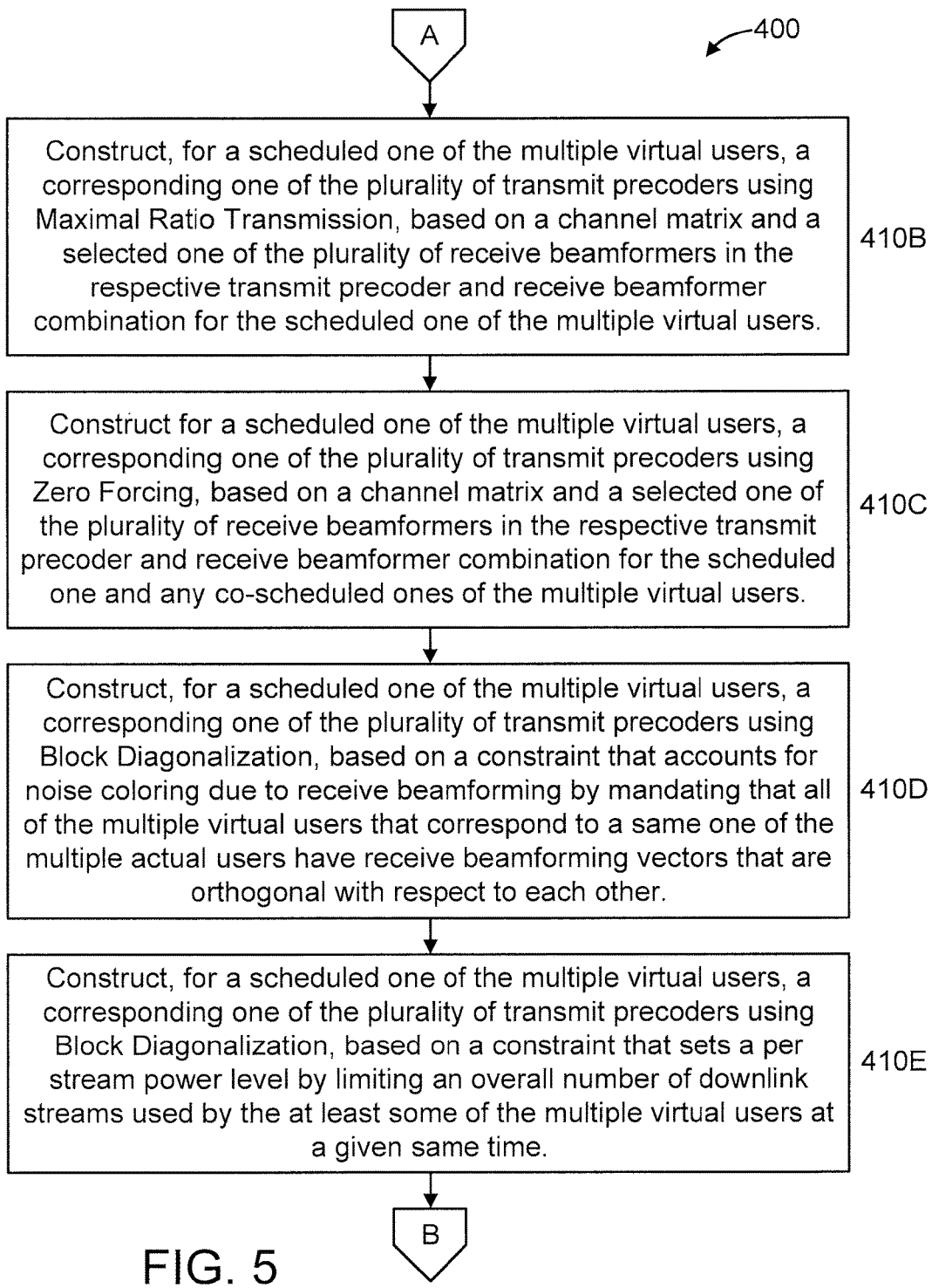
Figure 6:
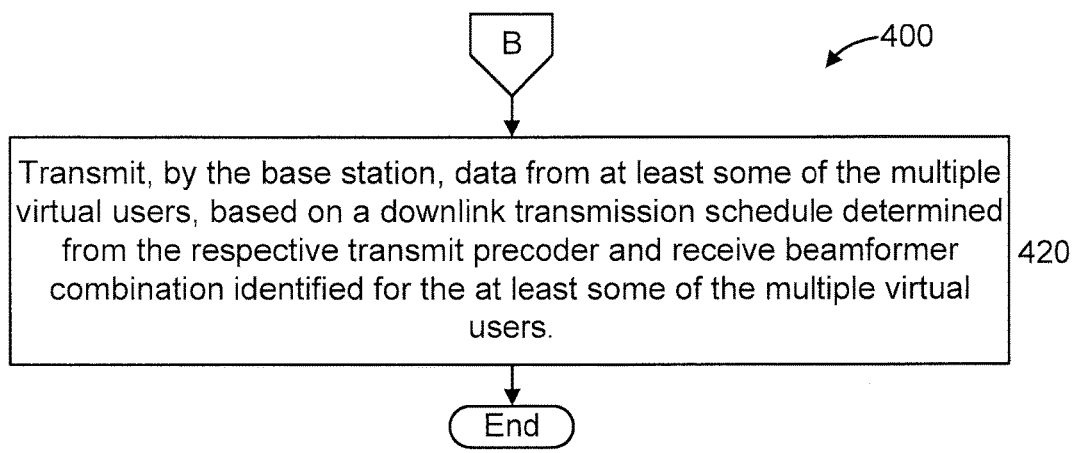

Further, it is to be appreciated that processing system 100 may perform at least part of the method described herein including, for example, at least part of method 400 of FIGS. 4-6. Similarly, part or all of system 200 may be used to perform at least part of method 400 of FIGS. 4-6.

FIG. 2 shows an exemplary Multi-User multiple input multiple output (MIMO) telecommunication system 200 in which embodiments of the present invention may be implemented is illustrated. In the downlink of system 200, multiple scheduled users (UEs) 202 in a cell 206 are simultaneously served by a base station (BS) 204. In the MU-MIMO downlink from the BS 204, each user is served a data stream in accordance with a schedule determined by the present invention. For example, the schedule can be determined based on maximizing a difference between two submodular set functions applied over a ground set of virtual users, as further described herein below. In this way, gains can be achieved over prior art scheduling approaches while maintaining reasonable complexity.

Figure 3:
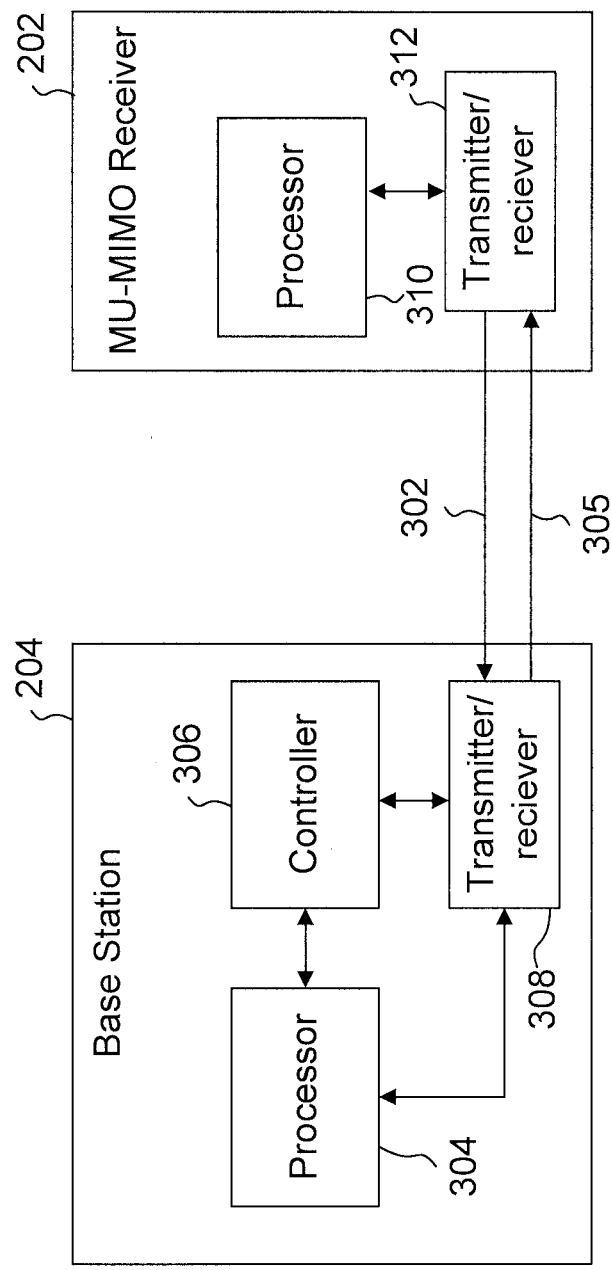
FIG. 3 shows an exemplary base station and a MU-MIMO user in accordance with an exemplary embodiment of the present invention.

Referring to FIG. 3, with continuing reference to FIG. 2, exemplary implementations of a base station system 204 and a MU-MIMO receiver system 202 are illustrated. The base station 204 may include a scheduler 304 and a processor 306, while the user 202 can include processor 310. The processor 306 and processor 310 can use respective storage mediums provided in the base station 204 and receiver 202. In addition, the base station 204 and the receiver 202 can include transmitters/receivers 308 and 312, respectively, for the transmission and reception of control signals. The user 202 can transmit control signals to the base station 204 on one or more uplink control channels 302 and the base station 204 can transmit control signals to the user 202 on one or more downlink control channels 305. The elements of the base station 204 and the MU-MIMO receiver 202 are discussed in more detail below with respect to method embodiments.

FIGS. 4-6 show an exemplary method for downlink scheduling in a Multi-User Multiple Input Multiple Output (MU-MIMO) telecommunication system, in accordance with an embodiment of the present invention. In an embodiment, the MU-MIMO telecommunication system can use linear transmit precoding.

At step 410, identify, by a base station, for each of multiple virtual users which collectively form a ground set of virtual users, a respective transmit precoder and receive beamformer combination that maximizes a difference between two submodular set functions applied over the ground set of virtual users or over subsets of the ground set. The respective transmit precoder and receive beamformer combination for each of the multiple virtual users can be identified from among a plurality of combinations formed from a respective one of a plurality of transmit precoders and a respective one of a plurality of receive beamformers.

In an embodiment, the ground set of virtual users can be formed from respective combinations of multiple actual users and the plurality of receive beamformers. In an embodiment, a size of the ground set of virtual users can be constrained relative to a value of a user channel vector.

In an embodiment, the two submodular set functions correspond to an achievable virtual user transmission rate. For example, in the case of Maximal Ratio Transmission (MRT), the two submodular set functions can correspond to $f_\psi^{MRT}(A)$ and $g_\psi^{MRT}(A)$. In the case of Zero Forcing (ZF), the two submodular set functions can correspond to $f_\psi^{ZF}(A)$ and $g_\psi^{ZF}(A)$. In the case of Block Diagonalization (BD), the two submodular set functions can correspond to $f_\psi^{BD}(A)$ and $g_\psi^{BD}(A)$. In an embodiment, the achievable virtual user transmission rate can be determined relative to one or more of the virtual users in the ground set of virtual users.

In an embodiment, step 410 can include steps 410A-410E.

At step 410A, construct the plurality of transmit precoders under a constraint that each of the multiple virtual users will receive data only in a time internal corresponding to a respective user ranking from among a plurality of user rankings.

At step 410B (corresponding to MRT), construct, for a scheduled one of the multiple virtual users, a corresponding one of the plurality of transmit precoders using Maximal Ratio Transmission, based on a channel matrix and a selected one of the plurality of receive beamformers in the respective transmit precoder and receive beamformer combination for the scheduled one of the multiple virtual users.

At step 410C (corresponding to ZF), construct for a scheduled one of the multiple virtual users, a corresponding one of the plurality of transmit precoders using Zero Forcing, based on a channel matrix and a selected one of the plurality of receive beamformers in the respective transmit precoder and receive beamformer combination for the scheduled one and any co-scheduled ones of the multiple virtual users.

At step 410D (corresponding to BD), construct, for a scheduled one of the multiple virtual users, a corresponding one of the plurality of transmit precoders using Block Diagonalization, based on a constraint that accounts for noise coloring due to receive beamforming by mandating that all of the multiple virtual users that correspond to a same one of the multiple actual users have receive beamforming vectors that are orthogonal with respect to each other.

At step 410E (corresponding to BD), construct, for a scheduled one of the multiple virtual users, a corresponding one of the plurality of transmit precoders using Block Diagonalization, based on a constraint that sets a per stream power level by limiting an overall number of downlink streams used by the at least some of the multiple virtual users at a given same time.

At step 420, transmit, by the base station, data from at least some of the multiple virtual users, based on a downlink transmission schedule determined from the respective transmit precoder and receive beamformer combination identified for the at least some of the multiple virtual users.

A further detailed description will now be given regarding various aspects of the present invention, in accordance with one or more embodiments of the present invention.

In an embodiment, the classical DL MU-MIMO system is considered with $M_t$ transmit antennas at the base station (BS) and $M_r$ receive antennas at each user. K active users are presumed in the cell of interest, with a focus on data transmission on a resource block in each scheduling interval. Without loss of generality, in the following analysis, each resource block is presumed to be of unit size, on which each user sees a frequency non-selective channel. Then, the signal received by the kth user is modeled as follows:

$$y_k = H_k x + \eta_k, k=1, \ldots, K, \quad (1)$$

where $H_k \in \mathbb{C}^{M_r, M_t}$ is the channel matrix and $\eta_k \sim CN(0,1)$ is the additive noise. The signal vector x transmitted by the BS can be expanded as $x = \Sigma_{k \in A} V_k s_k$, where A is the set of users that are co-scheduled (or grouped) together. $V_k$, $k \in A$ is the $M_t \times r_k$ transmit precoding matrix used to transmit to the kth user and has $r_k$ unit-norm columns. $s_k$ is the $r_k \times 1$ symbol vector intended for the kth user. Furthermore, let $S = \Sigma_{k \in A} r_k$ be the total number of co-scheduled streams or total rank. The total power for all streams is ρ. The practically most important power allocation is considered, which is to equally split the available power among all transmitted streams. Then, the power per stream given by ρ'=ρ/S and we have E[ss†]=ρ'I.

Define $A=[A_k]_{k \in A}$, where $A_k=\sqrt{\rho'} k$, $\forall k \in A$, as the scaled and concatenated transmit precoding matrix of size Mt×S for MU-MIMO transmission. Each user in order to receive its data, employs an RF analog receive beamforming front-end followed by baseband linear detection. Such an architecture is significantly preferred in mmWave systems. Herein, the inventions incorporate the practically meaningful scenario in which each user uses a codebook W for analog receive beamforming. To describe the data reception, we focus on any user k. To receive data sent on each one of its $r_k$ streams that user k employs $r_k$ unit-norm beamforming vectors from W. Let $G_k$ denote the $M_r \times k$ matrix whose columns are these beamforming vectors. The received signal post receive beamforming is down-converted and detected at baseband. Two types of detection methods are considered at baseband. The first one is the simplest method of detection at the baseband, in which no further mitigation is carried out to suppress inter-stream residual interference. This method is referred to as the matched filter (MF) baseband detector. The resulting signal-to-interference plus noise ratio (SINR) for the ith stream (or layer) of the kth user is given by the following:

$$\gamma_{i,k} = \frac{|[G_k^\dagger H_k A_k]i,i|^2}{1 + \sum_{j \neq i} |[G_k^\dagger H_k A_k]i,j|^2}, i=1,\ldots r_k \quad (2)$$

where $[.]_{i,j}$ is the (i,j)th element of the matrix argument. The corresponding information rate is given by the following:

$$\eta_{i,k} = \log(1+\gamma_{i,k}) \quad (3)$$

Hence, the information rate over all the streams of user k can be written as follows: $R_k = \Sigma_{i=1}^{r_k} \eta_{i,k}$. The second detection method considered is the optimal method of detection at the baseband, for which the corresponding information rate over all streams is given by the following:

$$R_k = \log|I + Q_k^{-1} G_k^\dagger H_k A_k (G_k^\dagger H_k A_k)^\dagger| \quad (4)$$

where $Q_k G_k^\dagger G_k + \Sigma_{l \in A \setminus k} G_k^\dagger H_k A_l (G_k^\dagger H_k A_l)^\dagger$ represents the covariance matrix of additive noise and interference from streams intended for other users. Note that the additive noise is colored by the receive beamforming operation.

The three linear transmit precoding methods are outlined that are considered herein and which cover all the main practical ones. Consider any given user set U along with a rank vector r. In all these methods, it is presumed for precoder construction that each user $k \in U$ that is assigned rank $r_k$ will receive data only in the span of its chosen a receive beamforming vectors in $G_k$. Consequently, the $r_k \times M_t$ matrix is defined as follows: $\tilde{H}_k = G_k^\dagger H_k$.

The construction of the transmit precoder matrices then proceeds by using the matrices $\{\tilde{H}_k\}_{k \in U}$.

Maximal Ratio Transmission (MRT): Here the transmit precoder $V_k$ used for any user $k \in U$ with rank $r_k$, is simply the matrix $\tilde{H}_k^\dagger D_k$, where $D_k$ is a diagonal matrix which normalizes all columns of $\tilde{H}_k^\dagger$ to have unit norm. Notice that the choice of the precoder does not depend on the co-scheduled users. However the power used for each layer does depend on the total number of co-scheduled layers.

Zero Forcing (ZF): Let $\tilde{H}=([\tilde{H}_k^\dagger]_{k \in U})^\dagger$ denote the $(\Sigma_{k \in U} r_k) \times M_t$ composite matrix. The matrix $V = \tilde{H}^\dagger (\tilde{H}\tilde{H}^\dagger)^{-1} D$ is obtained, where D is now a diagonal matrix which normalizes all columns of $\tilde{H}^\dagger (\tilde{H}\tilde{H}^\dagger)^{-1}$ to have unit norm. Then $V_k$ is obtained as the sub-matrix of V formed by the $r_k$ columns corresponding to user k.)

Block Diagonalization (BD): Let $\tilde{H}_{\bar{k}}=([\tilde{H}_j^\dagger]_{j \in U, j \neq k})^\dagger$ denote the $(\Sigma_{j \in U, j \neq k} r_j) \times M_t$ composite matrix that excludes user k. The matrix $\tilde{H}_k(I - \tilde{H}_{\bar{k}}^\dagger (\tilde{H}_{\bar{k}} \tilde{H}_{\bar{k}}^\dagger)^{-1} \tilde{H}_{\bar{k}})$ is then obtained and $V_k$ formed by choosing its first $r_k$ dominant right singular vectors corresponding to its first $r_k$ dominant singular values.

A description will now be given regarding a problem formulation, to which the present invention can be applied, in accordance with an embodiment of the present invention.

Our objective in the subsequent sections is to design efficient algorithms to optimize $\Sigma_{k \in U} w_k R_k$, where $w_k$ is the weight or priority assigned to user k, under certain practical constraints. Due to space constraints, in an embodiment, only the most natural pairings of precoder construction and receiver detection are considered, which are to use either MRT or ZF transmit precoding with the MF baseband detection. On the other hand, in an embodiment, BD precoding is used in conjunction with optimal baseband detection. Note that for each such combination of the aforementioned transmit precoder construction and receiver detection methods, the resulting weighted sum rate depends on the choice of user set U as well as the choice of transmit ranks and the receive beamforming vectors. Moreover, there can be a non-linear dependence (or coupling) between the choice of receive beamforming vectors and the transmit precoder construction. As a result, the optimization problem at hand appears to be intractable at the first glance.

A description will now be given regarding a structure in the rate expression, to which the present invention can be applied, in accordance with an embodiment of the present invention.

Initially, both MRT and ZF transmit precoders with matched filter baseband detection are considered. Our first observation then is that we can regard each user and receive beamformer combination as a virtual user. In particular, consider any stream of any user k that is received along any beamformer $w \in W$, and define $\psi$ as the corresponding virtual user with its channel given by the $1 \times M_t$ vector, $z_\psi^\dagger = w^\dagger H_k$. Then, the received statistic for this virtual user can be written as follows:

$$y_\psi = z_\psi^\dagger x + \eta_\psi \quad (5)$$

where $\eta_\psi \sim CN(0, 1)$. Define a ground set $\Psi$ of all virtual users $\psi$ such that $z_\psi \neq 0$ so that the size of $\Psi$ is at-most $K|W|^1$. Consider any choice of co-scheduled virtual users $A \subseteq \Psi$. Suppose MRT precoding at the BS, so that the transmit precoding vector for virtual user $\psi$ is given by $v_\psi = z_\psi / \|z_\psi\|$. For this choice using (5) and (3) the rate for virtual user $\psi \in A$ is given by the following:

$$R_\psi(A) = \ln\left(1 + \frac{\rho \|z_\psi\|^2 / |A|}{1 + \sum_{\psi' \in A \backslash \psi} \rho z_\psi^\dagger v_{\psi'} v_{\psi'}^\dagger z_\psi / |A|}\right) \quad (6)$$

On the other hand, for any $\psi \in \Psi \backslash A$, set $R\psi(A)=0$. The following result is provided that reveals the structure in the rate expression.

Proposition 1. The rate achieved by any virtual user $\psi \in \Psi$ under MRT precoding and set $A \subseteq \Psi : A / = \phi$, can be expressed as follows:

$$R_\psi(A) = \underbrace{\ln\left(|A| + \sum_{\psi' \in A} \rho z_\psi^\dagger v_{\psi'} v_{\psi'}^\dagger z_\psi\right)}_{\triangleq f_\psi^{MRT}(A)} - \underbrace{\ln\left(|A| + \sum_{\psi' \in A \backslash \psi} \rho z_\psi^\dagger v_{\psi'} v_{\psi'}^\dagger z_\psi\right)}_{\triangleq g_\psi^{MRT}(A)} \quad (7)$$

Further, for $A = \phi$, we define $R_\psi(\phi)=0$, where $\phi$ denotes the empty set, with $f_\psi^{MRT}(\phi) = g_\psi^{MRT}(\phi) = -\ln(2)$. Then, the set functions $f_\psi^{MRT}(.)$, $g_\psi^{MRT}(.)$ are both submodular set functions over the set $\Psi$.

The more complicated case of ZF precoding is now considered. The key complication here that we need to overcome is that the transmit precoder for each user depends not only on its channel matrix and choice of receive beamformers, but also on those of other co-scheduled users. Moreover, the latter dependence is non-linear. We again use the virtual user concept and recall the model in (5) for some virtual user $\psi \in \Psi$. Consider any choice of co-scheduled virtual users $A \subseteq \Psi$ and define the matrix $Z_A = [Z_\psi]_{\psi \in A}$ along with $Z_{A \backslash \psi} = [Z_{\psi'}]_{\psi' \in A \backslash \psi}$, and suppose that the matrix $Z_A^\dagger Z_A$ is invertible. The ZF matrix is given by $Z_A(Z_A^\dagger Z_A)^{-1} D$, where D is the diagonal matrix normalizing the columns of $Z_A(Z_A^\dagger Z_A)^{-1}$. The rate for virtual user $\psi \in A$ can be expressed as follows:

$$R_\psi(A) = \ln(1 + \rho \|z_\psi\|^2 / |A| - \rho z_\psi^\dagger Z_{A \backslash \psi}(Z_{A \backslash \psi}^\dagger Z_{A \backslash \psi})^{-1} Z_{A \backslash \psi}^\dagger z_\psi / |A|) \quad (8)$$

On the other hand, for any $\psi \in \Psi \backslash A$, set $R_\psi(A)=0$. Note the following:

$$\text{Res}(\psi, A \backslash \psi) \triangleq \|z_\psi\|^2 - z_\psi^\dagger Z_{A \backslash \psi}(Z_{A \backslash \psi}^\dagger Z_{A \backslash \psi})^{-1} Z_{A \backslash \psi}^\dagger z_\psi$$

is the squared norm of the component of $z_\psi$ in the orthogonal complement of $Z_{A \backslash \psi}$.

We now proceed to unearth the structure in this rate expression. Towards this end, let us first define the matrix $$B = \rho Z_\Psi^\dagger Z_\Psi \quad (9)$$

with the understanding that $B_A$, $\forall A \subseteq \Psi$ is the principal submatrix of B with row and column indices drawn from A. Note that $B_A = \rho Z_A^\dagger Z_A \ \forall A \subseteq \Psi$. Along similar lines, for each virtual user $\psi \in \Psi$ and any scalar $a \geq 0$, let us define the matrix, $$C(a, \psi) = a e_\psi e_\psi^\dagger + \rho Z_\Psi^\dagger Z_\Psi \quad (10)$$

where $e\psi$ is a $|\Psi| \times 1$ vector that has a one in its $\psi^{th}$ element and zeros everywhere else. As before, let $C_A(a,\psi) \ \forall A \subseteq \Psi$ be the principal submatrix of $C(a,\psi)$ with row and column indices drawn from A. Let us next define a family of subsets, $\mathfrak{T}$, of $\Psi$ such that $\phi \in \mathfrak{T}$ and all subsets A of $\Psi$ for which $B_A$ is invertible are members of $\mathfrak{T}$ and conversely for any non-empty member $A \in \mathfrak{T}$, $B_A$ is invertible. It is readily seen that this family is downward closed and that all singleton sets $\{\psi\}: \psi \in \Psi$ are members of $\mathfrak{T}$.

Our next result reveals that it is possible to write (8) in a more amenable form. The convention that $0 \ln(0) = 0$ is adapted and that $\ln|.|$ returns zero whenever the input matrix is empty or null matrix.

Proposition 2. The rate achieved by any virtual user under ZF precoding can be expressed as follows:

$$R_\psi(A) = \underbrace{(\ln|C_A(|A|, \psi)| - |A|\ln|A|)}_{f_\psi^{ZF}(A)} - \underbrace{(\ln|B_{A \backslash \psi}| - |A \backslash \psi|\ln|A|)}_{g_\psi^{ZF}(A)} \quad (11)$$

The functions $f_\psi^{ZF}(.)$, $f_\psi^{ZF}(.)$ are both submodular over the family $\mathfrak{T}$..

The case where the BS employs BD transmit precoding and each user employs the optimum baseband detector will now be analyzed. In this case, the rate across all virtual users that correspond to the same (real) user should be jointly considered. Furthermore, the coloring of the noise due to receive beamforming should be accounted for. To make the problem tractable, we follow an approach where we first assume that the power per stream (virtual user) is given and does not vary with the number of selected virtual users. This assumption results in no loss of optimality if we also consider all possible total number of streams that can be scheduled, and solve the problem at hand for each such total number. In particular, for each value, S, of the total number of streams, we fix the power per stream to be $\hat\rho = \rho/S$ and solve the weighted sum rate maximization under the constraint that no more than S streams can be scheduled. Then, suppose that we are any given a value for the power per stream $\hat\rho$. Let $u:\Psi \to \{1, \ldots, K\}$ denote a scalar valued function which returns the actual user corresponding to any virtual user in $\Psi$. Similarly, let $w:\Psi \to \mathcal{W}$ denote a vector valued function which returns the receive beamforming vector corresponding to any virtual user in $\Psi$. We will use the index $k \in \{1, \ldots, K\}$ to denote an actual user. For each user $k \in \{1, \ldots, K\}$, define the matrix as follows:

$$F^{(k)} = \hat\rho Z_\psi^\dagger Z_\psi + L^{(k)} \quad (12)$$

where $$L^{(k)} = [l^{(k)}_{\psi,\psi'}]_{\psi,\psi' \in \Psi}$$

is a $|\Psi| \times |\Psi|$ matrix whose $(\psi,\psi')^{th}$ entry is given by the following:

$$l^{(k)}_{\psi,\psi'} = \begin{cases} 0, & u(\psi) \neq u(\psi') \\ w(\psi)^\dagger w(\psi') & \text{else} \end{cases} \quad (13)$$

As done previously, we let $F^{(k)}_{\mathcal{A}}(L^{(k)}_{\mathcal{A}})$, $\forall \mathcal{A} \subseteq \Psi$ denote the principal submatrix of $F^{(k)}(L^{(k)})$ with row and column indices drawn from $\mathcal{A}$. We offer the following result.

Proposition 3. The rate achieved by any user under BD precoding can be expressed as follows:

$$R_k(\mathcal{A}) = \underbrace{\ln|F^{(k)}_{\mathcal{A}}|}_{f_k^{BD}(\mathcal{A})} - \underbrace{(\ln|F^{(k)}_{\mathcal{A} \cap \{\psi: u(\psi) = k\}}| + \ln|l^{(k)}_{\mathcal{A} \cap \{\psi: u(\psi) = k\}}|)}_{g_k^{BD}(\mathcal{A})} \quad (14)$$

The functions $f_k^{BD} BD(.)$, $g_k^{BD}(.)$ are both submodular over the family $\mathfrak{T}$.

A description will now be given regarding an algorithm design framework, in accordance with an embodiment of the present invention.

We will illustrate the design frame work that is based on optimizing the difference of submodular (DS) set functions. We proceed to explain the DS framework for ZF precoding, while noting that other precoding methods can be handled similarly. Then, the optimization problem at hand can be posed as follows:

$$\max_{\mathcal{A} \in \mathfrak{T} \& \mathcal{A} \in \mathcal{J}} \left\{ \sum_{\psi \in \Psi} R_\psi(\mathcal{A}) \right\} \quad (15)$$

where we use the family of sets $\mathcal{J}$ to impose further constraints. We consider two key practical constraints:

The total number of selected virtual users should not exceed a bound, i.e., a cardinality constraint $|\mathcal{A}| \leq S_t$ is imposed, where $S_t$ is the number of transmit RF chains.

The total number of selected virtual users that correspond to the same real user k should not exceed a bound, i.e., a cardinality constraint $|\{\psi \in \mathcal{A}: u(\psi) = k\}| \leq S_{r,k}$, $\forall k$ is imposed, where $S_{r,k}$ is the number of receive RF chains at user k.

Let $\mathcal{J}$ be the collection of all subsets of $\Psi$ that meet the aforementioned two constraints. Then, we have the following observation that follows upon verifying the properties stated hereinafter.

Proposition 4. The family $\mathcal{J}$ defines a matroid over $\Psi$. Using (11) we can re-state (15) as follows:

$$\max_{\mathcal{A} \in \mathfrak{T} \& \mathcal{A} \in \mathcal{J}} \left\{ \sum_{\psi \in \Psi} (f_\psi^{ZF}(\mathcal{A}) - g_\psi^{ZF}(\mathcal{A})) \right\} \quad (16)$$

The DS framework entails an iterative approach in which each iteration seeks to improve the current best solution at hand by solving a simpler maximization problem. Suppose at any iteration, the current best solution is given by $\hat{\mathcal{A}}$. Then, let $g(\mathcal{A}/B) \triangleq g(\mathcal{A} \cup B) - g(B)$ define the marginal gain obtained upon adding set $\mathcal{A}$ to set B for any set function $g(.)$, for any subsets $\mathcal{A}$, B of a ground set such that $g(B)$, $g(\mathcal{A} \cup B)$ are both defined. Next, define a modular upper bound as follows:

$$g^{ZF,UB}_{\hat{\mathcal{A}}}(\mathcal{A}) \triangleq \sum_{\psi' \in \mathcal{A}} a_{\hat{\mathcal{A}},\psi}(\psi'), \forall \mathcal{A} \in \mathfrak{T} \quad (17)$$

$$\text{where } a_{\hat{\mathcal{A}},\psi}(\psi') = \begin{cases} g^{ZF}_{\psi}(\psi') & \psi' \notin \hat{\mathcal{A}} \\ g^{ZF}_{\psi}(\psi'/\hat{\mathcal{A}} \setminus \psi') & \text{else} \end{cases} \quad (18)$$

It can be shown that $$g^{ZF,UB}_{\hat{\mathcal{A}},\psi}(\mathcal{A}) \geq g_\psi^{ZF}(\mathcal{A}), \forall \mathcal{A} \in \mathfrak{T} \quad (19)$$

with equality in (19) at $\hat{\mathcal{A}} = \mathcal{A}$. Thus, $R_{\hat{\mathcal{A}},\psi}(\mathcal{A}) = f^{ZF}_{(\mathcal{A})} - g^{ZF,UB}_{\hat{\mathcal{A}},\psi}(\mathcal{A})$, $\forall \mathcal{A} \in \mathfrak{T}$, satisfies $R_{\hat{\mathcal{A}},\psi}(\mathcal{A}) \leq R_\psi(\mathcal{A})$, $\forall \mathcal{A} \in \mathfrak{T}$ with equality at $\hat{\mathcal{A}} = \mathcal{A}$. With this bound in hand, we proceed to solve the following problem $$\max_{\mathcal{A} \in \mathfrak{T} \& \mathcal{A} \in \mathcal{J}} \{R_{\hat{\mathcal{A}},\psi}(\mathcal{A})\} \quad (20)$$

Let $\check{\mathcal{A}}$ be an obtained optimized solution. Then, if $R_{\hat{\mathcal{A}},\psi}(\check{\mathcal{A}}) > R_{\hat{\mathcal{A}}\psi}(\hat{\mathcal{A}})$, we can be sure that the current best solution at hand has been improved, i.e., $R_\psi(\check{\mathcal{A}}) > R_\psi(\hat{\mathcal{A}})$. The key property of (20) is that since the objective is now a submodular set function and the constraint is a matroid, (20) can be relatively well optimized via simple methods such as the classical greedy method. An important by-product of the submodularity of the objective is that we can use the Lazy Greedy implementation to significantly lower the complexity of the greedy method. The DS procedure terminates if there is no improvement in the current best solution at hand. Otherwise, we proceed to the next iteration using $\hat{\mathcal{A}} \rightarrow \check{\mathcal{A}}$ as the current best solution.

A description will now be given of various definitions, lemmas, and proposition proofs, in accordance with one or more embodiments of the present invention.

Definition 1. Let $\Omega$ be a ground set and h: $2^\Omega > \text{IR}$ be a real-valued set function defined on the subsets of $\Omega$. The set function $h(.)$ is a submodular set function over $\Omega$ if it satisfies, $$h(B \cup_a) - h(B) \leq h(A \cup_a) - h(A),$$

$$\forall A \subseteq B \subseteq \Omega \& a \in \Omega \setminus B \quad (21)$$

Definition 2. $(\Omega, \underline{I})$, where $\underline{I}$ is collection of some subsets of $\Omega$, is said to be a matroid if
$\underline{I}$ is downward closed, i.e., $A \in \underline{I}$ & $B \subseteq A \Rightarrow B \in \underline{I}$
For any two members $F_1 \in \underline{I}$ and $F_2 \in \underline{I}$ such that $|F_1| < |F_2|$, there exists $e \in F_2 \setminus F_1$ such that $F_1 \cup \{e\} \in \underline{I}$. This property is referred to as the exchange property.

Definition 3. Let $\mathfrak{T}$ be any family of subsets of $\Omega$ that is downward closed. A real-valued set function h: $2^\Omega \rightarrow \text{IR}$ is submodular over $\mathfrak{T}$, if it satisfies (21) for each choice of A $\subseteq B \subseteq \Omega \& a \in \Omega \setminus B$ such that $B \cup a \in \mathfrak{X}$ (so that A, B, $a \in \mathfrak{X}$). Hence, as used herein, a submodular function refers to a function wherein the reward of adding a new element to a set is larger if the set is smaller. In other words, if set B contains all the elements of set A, and possibly more, the reward of adding a new element to set B is less than the reward of adding the same element to the smaller set A.

Lemma 1. Consider any N×N positive definite matrix M and let $M_S$, $\forall S \subseteq \Omega = \{1, \ldots, N\}$, denote the principal submatrix of M with row and column indices drawn from S. Then, the set function defined as $h(S) = \ln|M_S|$, $\forall S \subseteq \Omega$ is a submodular set function over $\Omega$. Thus, for any $j \in \Omega$, the set function defined as $h_j(S) = \ln|M_{S/j}|$, $\forall S \subseteq \Omega$ is also a submodular set function over $\Omega$.

Lemma 2. Consider any choice of co-scheduled virtual users $A \subseteq \Psi$ and any virtual user $\psi \in A$. Define the matrix $Z_A = [z_\psi]_{\psi \in A}$ along with $Z_{A \setminus \psi} = [z_{\psi'}]_{\psi' \in A \setminus \psi}$. Further, define diagonal matrices $E_A = \text{diag}\{e_{\psi'}\}_{\psi' \in A}$ and $E_{A \setminus \psi} = \text{diag}\{e_{\psi'}\}_{\psi' A \setminus \psi}$. Then, we have the following:

$$|E_A + Z_A^\dagger Z_A| = |E_{A \setminus \psi} + Z_{A \setminus \psi}^\dagger Z_{A \setminus \psi}| \times (e_\psi + \|z_\psi\|^2 - z_\psi^\dagger Z_{A \setminus \psi} (E_{A \setminus \psi} + Z_{A \setminus \psi}^\dagger Z_{A \setminus \psi})^{-1} Z_{A \setminus \psi}^\dagger z_\psi) \quad (22)$$

Note that when $E_{A \setminus \psi} = 0$ then, $$|E_A + Z_A^\dagger Z A| = |Z_{A \setminus \psi}^\dagger Z_{A \setminus \psi}|(e_\psi + \text{Res}(\psi, A \setminus \psi))$$

where $\text{Res}(\psi, A \setminus \psi) = \|z_\psi\|^2 - z_\psi^\dagger Z_{A \setminus \psi}(Z_{A \setminus \psi}^\dagger Z_{A \setminus \psi})^{-1} Z_{A \setminus \psi}^\dagger z_\psi$ Lemma 3. A few facts are collected that follow after some algebra.

The real-valued functions $-x \ln(x)$, $\forall x \geq 0$ and $-x \ln(x+1)$, $\forall x \geq 0$ are both concave in x for all $x \geq 0$.

For any fixed $a \geq 0$, the real-valued function $-(a+1)\ln(a+x+1) + a\ln(a+x)$, $\forall x \geq 0$ is decreasing in x for all $x \geq 0$.

The real-valued function $-x \ln(x+1) + x \ln(x)$, $\forall x \geq 0$ is decreasing in x for all $x \geq 0$.

Proof of Proposition 1

Note first that the rate expression in (7) satisfies $R_\psi(A) = 0$, $\forall \psi \notin A$. Further, for each $\psi \in A$ it can be readily verified that (7) follows upon expressing the RHS of (6) in a different form. Then, consider the first term $f_\psi^{MRT}:2^\Psi \rightarrow \text{IR}$ in the RHS of (7). To show that $f_\psi^{MRT}(.)$ for each $\psi \in \Psi$ is a submodular set function over $\Psi$, the following property of the logarithm function is invoked:

$$\ln(c+e) - \ln(c) \leq \ln(d+f) - \ln(d),$$

$$\forall 0 < d \leq c \& f \geq e \geq 0 \quad (23)$$

The above property follows from the concavity of the logarithm function. Considering any $\varepsilon \subseteq \mathcal{F} \subseteq \Psi : \varepsilon \neq \phi$ and any $\psi'' \in \Psi \setminus \mathcal{F}$, the following is defined as follows:

$$e = f = 1 + \rho z_{\psi''}^\dagger v_{\psi''} v_{\psi''}^\dagger,$$

$$d = |\mathcal{E}| + \sum_{\psi' \in \mathcal{E}} \rho z_\psi^\dagger v_{\psi'} v_{\psi'}^\dagger z_\psi,$$

$$c = |\mathcal{F}| + \sum_{\psi' \in \mathcal{F}} \rho z_\psi^\dagger v_{\psi'} v_{\psi'}^\dagger z_\psi \quad (24)$$

Note that the scalars so defined satisfy $d \leq c$ and $f \geq e$ so that we can invoke (23) with this choice to verify that the required condition in (21) is satisfied. Now consider the case $\varepsilon = \phi$. Clearly, when $\mathcal{F} = \phi$ the required condition is trivially satisfied. Hence, suppose that $\mathcal{F} \neq \phi$ and define the scalars c, e & f as in (24). To prove that (21) indeed holds, the following is shown:

$$\ln(c+e) - \ln(c) \leq \ln(e) - f_\psi^{MRT}(\phi) = \ln(e) + \ln(2), \quad (25)$$

Note that since $c \geq 1$ and $e \geq 1$, the LHS in (25) is clearly no greater than $\ln(1+e)$. Therefore, (21) holds if it can be shown that $\ln(2) > \ln(1+1/e)$. The latter inequality is true since $e \geq 1$.

Next, to show that $g_\psi^{MRT}(.)$ is a submodular set function, we consider any $\varepsilon \subseteq \mathcal{F} \subseteq \Psi : \varepsilon \neq \phi$ with any $\psi'' \in \Psi \setminus \mathcal{F}$, and define the following:

$$e = f = 1 + (z_\psi^\dagger v_{\psi''} v_{\psi''}^\dagger z_\psi) 1\{\psi'' \neq \psi\},$$

$$d = |\mathcal{E}| + \sum_{\psi' \in \mathcal{E}: \psi' \neq \psi} \rho z_\psi^\dagger v_{\psi'} v_{\psi'}^\dagger z_\psi,$$

$$c = |\mathcal{F}| + \sum_{\psi' \in \mathcal{F}: \psi' \neq \psi} \rho z_\psi^\dagger v_{\psi'} v_{\psi'}^\dagger z_\psi,$$

where $1\{.\}$ denotes an indicator function that is one if the input argument is true and is zero otherwise. Clearly this choice also satisfies $d \leq c$ and $f \geq e$, so that (23) can be invoked with this choice to verify that the required condition in (21) is again satisfied. The case with $\varepsilon = \phi$ can be proved in a similar manner as before.

Proof of Proposition 2

First, the case $A \in \mathfrak{X}$ with $\psi \in A$ is considered. Here, (8) can be written as follows:

$$R_\psi(A) = \ln(|A| + \rho \|z_\psi\|^2 \rho z_\psi^\dagger Z_{A \setminus \psi}(Z_{A \setminus \psi}^\dagger Z_{A \setminus \psi})^{-1} Z_{A \setminus \psi}^\dagger z_\psi \quad (26)$$

Invoking Lemma 2, the RHS of (26) can be re-written to obtain the following:

$$R_\psi(A) = \ln|C_A(|A|, \psi)| - \ln|A| - \ln|C_{A \setminus \psi}(|A|, \psi)| \quad (27)$$

Then, since $B_{A \setminus \psi} = C_{A \setminus \psi}(|A|, \psi)$ and $\ln|A| = |A| \ln|A|(+A| - 1)\ln|A|$, it can be deduced that (11) holds. On the other hand, whenever $\psi \notin A$, it can be verified that (11) yields $R_\psi(A) = 0$ which is consistent.

We proceed to prove the submodularity of $g_\psi^{MRT}(.)$ for each $\psi \in \Psi$ over $\mathfrak{X}$ first. Towards this end, we arbitrarily pick any $\psi \in \Psi$ and consider each one of the two terms whose sum gives $g_\psi^{MRT}(.)$ Considering the first term, if we define $h(A) = \ln|B_{A \setminus \psi}|$, $\forall A \subseteq \Psi$, then this set function can be verified to be submodular over I upon invoking Lemma 1. For the second term, we define $h(A) = -|A \setminus \psi| \ln|A|$, $\forall A \subseteq \Psi$. It will be shown that this set function can be verified to be submodular over $\Omega$ (and hence over $\mathfrak{X}$). Consider any $\varepsilon \subseteq \mathcal{F} \in \Omega$ with any $\psi'' \in \Psi \setminus \mathcal{F}$. To establish submodularity when $\psi \notin \mathcal{F}$ (so that $\psi \notin \varepsilon$) and $\psi'' \neq \psi$, it is shown that $$-(|\varepsilon|+1)\ln(|\varepsilon|+1) + |\varepsilon|\ln(|\varepsilon|) \geq -(|\mathcal{F}|+1)\ln(|\mathcal{F}|+1) + |\mathcal{F}|\ln(|\mathcal{F}|) \quad (28)$$

holds due to the concavity of $-x \ln(x)$ for all $x \geq 0$ stated as the first fact in Lemma 3. Further, when $\psi \notin \mathcal{F}$ but $\psi'' = \psi$, it is shown that $$-(|\varepsilon|)\ln(|\varepsilon|+1) + |\varepsilon|\ln(|\varepsilon|) \geq -(|\mathcal{F}|)\ln(|\mathcal{F}|+1) + |\mathcal{F}|\ln(|\mathcal{F}|) \quad (29)$$

follows from the third fact stated in Lemma 3. Next, when $\psi \in \varepsilon$ (so that $\psi \in \mathcal{F}$) and $\psi'' \neq \psi$, we need to show that $$-(|\varepsilon|)\ln(|\varepsilon|+1) + (|\varepsilon|-1)\ln(|\varepsilon|) \geq -(|\mathcal{F}|)\ln(|\mathcal{F}|+1) + (|\mathcal{F}|-1)\ln(|\mathcal{F}|) \quad (30)$$

holds due to the concavity of $-x \ln(x+1)$ for all $x \geq 0$ stated as the first fact in Lemma 3. Finally, when $\psi \notin \varepsilon$ but $\psi \in \mathcal{F}$ and $\psi'' \neq \psi$, it is shown that $$-(|\varepsilon|+1)\ln(|\varepsilon|+1)+(|\varepsilon|)\ln(|\varepsilon|) \geq -(|\mathcal{F}|)\ln(|\mathcal{F}|+1)+(|\mathcal{F}|-1)\ln(|\mathcal{F}|) \quad (31)$$

(29) follows by first using the concavity of $-x \ln(x+1)$ for all $x \geq 0$ to deduce $$-(+\mathcal{F}|)\ln(|\mathcal{F}|+1)+(|\mathcal{F}|-1)\ln(|\mathcal{F}|) \leq -(|\varepsilon|+1)\ln(|\varepsilon|+2)+(|\varepsilon|)\ln(|\varepsilon|+1)$$

and then using the second fact stated in Lemma 3 to confirm that $$-(|\varepsilon|+1)\ln(|\varepsilon|+2)+(|\varepsilon|)\ln(|\varepsilon|+1) \leq -(|\varepsilon|+1)\ln(|\varepsilon|+1)+(|\varepsilon|)\ln(|\varepsilon|)$$

In summary since $g_\psi^{MRT}(.)$ is the sum of two terms that are each submodular over $\mathfrak{T}$, we can confirm that $g_\psi^{MRT}(.)$ is submodular over $\mathfrak{T}$.

Now we embark upon the more involved part of proving the submodularity of $f_\psi^{MET}(.)$ over $\mathfrak{T}$. Here although as before $f_\psi^{MRT}(.)$ is the sum of two terms, we have to consider both the terms in $f_\psi^{MRT}(.)$ together. This is because the first term in $f_\psi^{MRT}(.)$ need not be submodular. However, as shown below, the second term in $f_\psi^{MRT}(.)$ adequately compensates and makes the sum submodular. Let us define a set function $g(A) = -(|A|+1)\ln(|A|+1) + |A|\ln|A|, \forall\, A \subseteq \Psi$ which can be verified using Lemma 3 to be a decreasing set function. Any $\varepsilon \subseteq \mathcal{F} \in \mathfrak{T}$ with any $\psi'' \in \Psi \backslash \mathcal{F} : \mathcal{F} \cup \psi'' \in \mathfrak{T}$ can be considered. Further, it suffices to consider $\mathcal{F} : |\mathcal{F}| = |\varepsilon|+1$. Then, we systematically analyze one of the four possible cases which captures all the techniques needed to prove the other three cases as well:

Case $\psi \in \varepsilon$: Here, we must have $\psi \in \mathcal{F}$ and $\psi'' \neq \psi$. Then, $\Delta_{\mathcal{F},\psi''} \triangleq f_\psi^{MRT}(\mathcal{F} \cup \psi'') - f_\psi^{MRT}(\mathcal{F})$ can be expanded using Lemma 2 as follows:

$$\Delta_{\mathcal{F},\psi''} = \ln(|\mathcal{F}|+1+\mathrm{Res}(\psi,\mathcal{F} \backslash \psi \cup \psi''))-\ln(|\mathcal{F}|+\mathrm{Res}(\psi,\mathcal{F} \backslash \psi))+\ln(\mathrm{Res}(\psi'',\mathcal{F} \backslash \psi))+g(|\mathcal{F}|) \quad (32)$$

A term is added and subtracted and $\Delta_{\mathcal{F},\psi''}$ is written as follows:

$$\Delta_{\mathcal{F},\psi''} = \ln(|\mathcal{F}|+1+\mathrm{Res}(\psi,\mathcal{F} \backslash \psi \cup \psi''))-\ln(|\mathcal{F}|+\mathrm{Res}(\psi,\mathcal{F} \backslash \psi))+\ln(\mathrm{Res}(\psi'',\mathcal{F} \backslash \psi))+g(|\mathcal{F}|)+\ln(|\mathcal{F}|+\mathrm{Res}(\psi,\mathcal{F} \backslash \psi \cup \psi''))-\ln(|\mathcal{F}|+\mathrm{Res}(\psi,\mathcal{F} \backslash \psi \cup \psi'')) \quad (33)$$

Similarly, $\Delta_{\varepsilon,\psi''} \triangleq f_\psi^{MRT}(\varepsilon \cup \psi'') - f_\psi^{MRT}(\varepsilon)$ is expressed as follows:

$$\Delta_{\varepsilon,\psi''} = \ln(|\varepsilon|+1+\mathrm{Res}(\psi,\varepsilon \backslash \psi \cup \psi''))-\ln(|\varepsilon|+\mathrm{Res}(\varepsilon \backslash \psi))+\ln(\mathrm{Res}(\psi'',\varepsilon \backslash \psi))+g(|\varepsilon|)+\ln(|\mathcal{F}|+\mathrm{Res}(\psi,\varepsilon \backslash \psi))-\ln(|\mathcal{F}|+\mathrm{Res}(\psi,\varepsilon \backslash \psi)) \quad (34)$$

Now, a key observation using Lemma 1 and the fact that $|\mathcal{F}| = |\varepsilon|+1$ is that $$\ln(|\varepsilon|+1+\mathrm{Res}(\psi,\varepsilon \backslash \psi \cup \psi''))+\ln(\mathrm{Res}(\psi'',\varepsilon \backslash \psi))\ln(|\mathcal{F}|+\mathrm{Res}(\psi,\varepsilon \backslash \psi)) \geq \ln(|\mathcal{F}|+\mathrm{Res}(\psi,\mathcal{F} \backslash \psi \cup \psi''))+\ln(\mathrm{Res}(\psi'',\mathcal{F} \backslash \psi))-\ln(|\mathcal{F}|+\mathrm{Res}(\psi,\mathcal{F} \backslash \psi)) \quad (35)$$

Then, to prove submodularity, i.e., $\Delta_{\mathcal{F},\psi''} \leq \Delta_{E,\psi''}$, it suffices to show that $$\ln(|\mathcal{F}|+1+\mathrm{Res}(\psi,\mathcal{F} \backslash \psi \cup \psi''))-\ln(|\mathcal{F}|+\mathrm{Res}(\psi,\mathcal{F} \backslash \psi \cup \psi''))+g(|\mathcal{F}|) \leq \ln(|\varepsilon|+1+\mathrm{Res}(\psi,\varepsilon \backslash \psi))-\ln(|\varepsilon|+\mathrm{Res}(\psi,\varepsilon \backslash \psi))+g(|\varepsilon|) \quad (36)$$

Then, since $\ln(|\varepsilon|+1+\mathrm{Res}(\psi,\varepsilon \psi))-\ln(|\varepsilon|+\mathrm{Res}(\psi,\varepsilon \backslash \psi)) \geq 0$, it suffices to show the following:

$$\ln(|\mathcal{F}|+1+\mathrm{Res}(\psi,\mathcal{F} \backslash \psi \cup \psi''))-\ln(|\mathcal{F}|+\mathrm{Res}(\psi,\mathcal{F} \backslash \psi \cup \psi''))+g(|\mathcal{F}|) \leq g(|\varepsilon|) \quad (37)$$

To show (37), the concavity of the logarithm function is exploited to deduce the following fact:

$$\ln(|\mathcal{F}|+1+\mathrm{Res}(\psi,\mathcal{F} \backslash \psi \cup \psi''))-\ln(|\mathcal{F}|+\mathrm{Res}(\psi,\mathcal{F} \backslash \psi \cup \psi'')) \leq \ln(|\mathcal{F}|+1)-\ln(|\mathcal{F}|) \quad (38)$$

Using (38)ln(37) and recalling that $|\mathcal{F}| = |\varepsilon|+1$, it can be seen that to establish submodularity in this case, it is enough to show that $$-(|\varepsilon|+1)\ln(|\varepsilon|+2)-|\varepsilon|\ln(|\varepsilon|+1) \leq -(|\varepsilon|+1)|\ln(|\varepsilon|+1)-|\varepsilon|\ln(|\varepsilon|) \quad (39)$$

Finally, (39) holds true from the second fact stated in Lemma 3.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for downlink scheduling in a Multi-User Multiple Input Multiple Output (MU-MIMO) telecommunication system, comprising:
   identifying, by a base station, for each of multiple virtual users which collectively form a ground set of virtual users, a respective transmit precoder and receive beamformer combination that maximizes a difference between two submodular set functions applied over the ground set of virtual users, from among a plurality of combinations formed from a respective one of a plurality of transmit precoders and a respective one of a plurality of receive beamformers; and
   transmitting, by the base station, data from at least some of the multiple virtual users, based on a downlink transmission schedule determined from the respective transmit precoder and receive beamformer combination identified for the at least some of the multiple virtual users,
   wherein the ground set of virtual users is formed from respective combinations of multiple actual users and the plurality of receive beamformers, and wherein the two submodular set functions correspond to an achievable virtual user transmission rate.

2. The computer-implemented method of claim 1, further comprising constructing the plurality of transmit precoders under a constraint that each of the multiple virtual users will receive data only in a time internal corresponding to a respective user ranking from among a plurality of user rankings.

3. The computer-implemented method of claim 1, wherein the MU-MIMO telecommunication system uses linear transmit precoding.

4. The computer-implemented method of claim 1, wherein for a scheduled one of the multiple virtual users, a corresponding one of the plurality of transmit precoders is constructed using Maximal Ratio Transmission, based on a channel matrix and a selected one of the plurality of receive beamformers in the respective transmit precoder and receive beamformer combination for the scheduled one of the multiple virtual users.

5. The computer-implemented method of claim 1, wherein a size of the ground set of virtual users is constrained relative to a value of a user channel vector.

6. The computer-implemented method of claim 1, wherein the difference between the two submodular set functions corresponds to the achievable transmission rate.

7. The computer-implemented method of claim 1, wherein the respective transmit precoder and receive beamformer combination is identified based on the two submodular set functions being applied over subsets of the ground set of virtual users.

8. The computer-implemented method of claim 7, wherein for a scheduled one of the multiple virtual users, a corresponding one of the plurality of transmit precoders is constructed using Zero Forcing, based on a channel matrix and a selected one of the plurality of receive beamformers in the respective transmit precoder and receive beamformer combination for the scheduled one and any co-scheduled ones of the multiple virtual users.

9. The computer-implemented method of claim 1, wherein for a scheduled one of the multiple virtual users, a corresponding one of the plurality of transmit precoders is constructed using Block Diagonalization, based on a constraint that accounts for noise coloring due to receive beamforming by mandating that all of the multiple virtual users that correspond to a same one of the multiple actual users have receive beamforming vectors that are orthogonal with respect to each other.

10. The computer-implemented method of claim 1, wherein for a scheduled one of the multiple virtual users, a corresponding one of the plurality of transmit precoders is constructed using Block Diagonalization, based on a constraint that sets a per stream power level by limiting an overall number of downlink streams used by the at least some of the multiple virtual users at a given same time.

11. The computer-implemented method of claim 1, wherein the achievable virtual user transmission rate is determined relative to one or more of the virtual users in the ground set of virtual users.

12. A non-transitory article of manufacture tangibly embodying a computer readable program which when executed causes a computer to perform the steps of claim 1.

13. A base station for downlink scheduling in a Multi-User Multiple Input Multiple Output (MU-MIMO) telecommunication system, comprising:
   a processor configured to identify, for each of multiple virtual users which collectively form a ground set of virtual users, a respective transmit precoder and receive beamformer combination that maximizes a difference between two submodular set functions applied over the ground set of virtual users, from among a plurality of combinations formed from a respective one of a plurality of transmit precoders and a respective one of a plurality of receive beamformers; and
   a transmitter configured to transmit data from at least some of the multiple virtual users, based on a downlink transmission schedule determined from the respective transmit precoder and receive beamformer combination identified for the at least some of the multiple virtual users,
   wherein the ground set of virtual users is formed from respective combinations of multiple actual users and the plurality of receive beamformers, and wherein the two submodular set functions correspond to an achievable virtual user transmission rate.

14. The base station method of claim 13, wherein the processor is further configured to construct the plurality of transmit precoders under a constraint that each of the multiple virtual users will receive data only in a time internal corresponding to a respective user ranking from among a plurality of user rankings.

15. The base station of claim 13, wherein for a scheduled one of the multiple virtual users, the processor is further configured to construct a corresponding one of the plurality of transmit precoders using Maximal Ratio Transmission, based on a channel matrix and a selected one of the plurality of receive beamformers in the respective transmit precoder and receive beamformer combination for the scheduled one of the multiple virtual users.

16. The base station of claim 13, wherein the difference between the two submodular set functions corresponds to the achievable transmission rate.

17. The base station of claim 13, wherein the respective transmit precoder and receive beamformer combination is identified based on the two submodular set functions being applied over subsets of the ground set of virtual users.

18. The base station of claim 17, wherein for a scheduled one of the multiple virtual users, the processor is further configured to construct a corresponding one of the plurality of transmit precoders using Zero Forcing, based on a channel matrix and a selected one of the plurality of receive beamformers in the respective transmit precoder and receive beamformer combination for the scheduled one and any co-scheduled ones of the multiple virtual users.

19. The base station of claim 13, wherein for a scheduled one of the multiple virtual users, the processor is further configured to construct a corresponding one of the plurality of transmit precoders using Block Diagonalization, based on a constraint that accounts for noise coloring due to receive beamforming by mandating that all of the multiple virtual users that correspond to a same one of the multiple actual users have receive beamforming vectors that are orthogonal with respect to each other.

20. The base station of claim 13, wherein for a scheduled one of the multiple virtual users, the processor is further configured to construct a corresponding one of the plurality of transmit precoders using Block Diagonalization, based on a constraint that sets a per stream power level by limiting an overall number of downlink streams used by the at least some of the multiple virtual users at a given same time.

\* \* \* \* \*